(No Model.) 3 Sheets—Sheet 1.
E. F. SPAULDING.
FASTENING FOR PULLEYS.
No. 286,340. Patented Oct. 9, 1883.
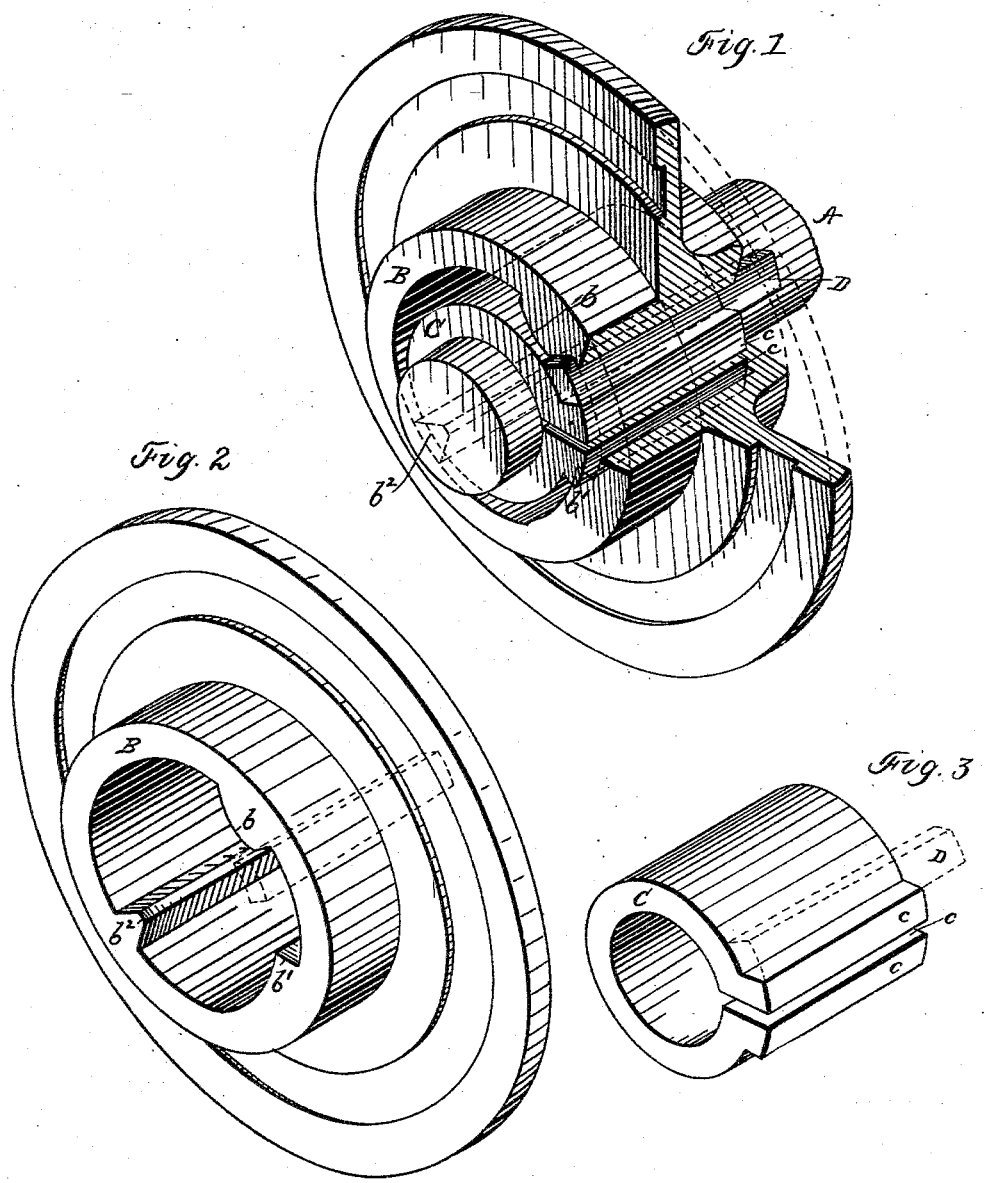
Witnesses.
W. R. Edelen.
Robt H Parker.
Inventor.
E. F. Spaulding
Per Hallock & Hallock
Att's (No Model.) 3 Sheets—Sheet 2.
E. F. SPAULDING.
FASTENING FOR PULLEYS.
No. 286,340. Patented Oct. 9, 1883.
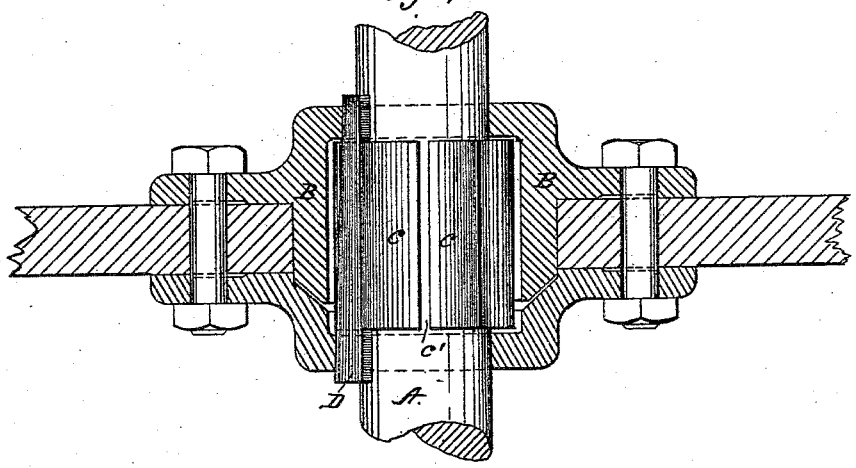
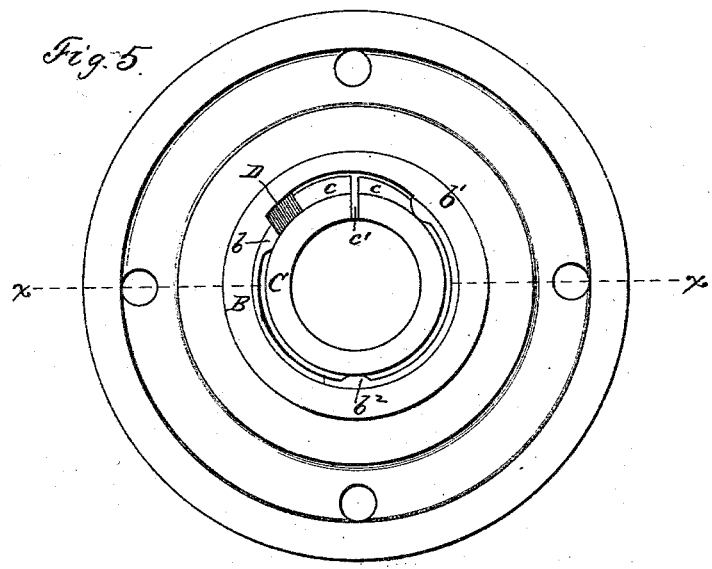
Witnesses.
W. R. Edelen
Robt H. Porter
Inventor.
E. F. Spaulding.
Per Hallock & Hallock
Att's (No Model.) 3 Sheets—Sheet 3.

E. F. SPAULDING.
FASTENING FOR PULLEYS.

No. 286,340. Patented Oct. 9, 1883.

Witnesses.
W. R. Edelen
Robt A. Porter.

Inventor
E. F. Spaulding
Per Hallock & Hallock
Att'y

UNITED STATES PATENT OFFICE.

ELIJAH F. SPAULDING, OF HARTFORD, CONNECTICUT.

FASTENING FOR PULLEYS.

SPECIFICATION forming part of Letters Patent No. 286,340, dated October 9, 1883.

Application filed August 17, 1883. (No model.)

*To all whom it may concern:*

Be it known that I, ELIJAH F. SPAULDING, a citizen of the United States, residing at Hartford, in the county of Hartford and State of Connecticut, have invented certain new and useful Improvements in Fastenings for Pulleys; and I do hereby declare the following to be a full, clear, and exact description of the invention, such as will enable others skilled in the art to which it appertains to make and use the same.

This invention consists in providing new and improved means for attaching belt-pulleys, gears, couplings, &c., to shafting.

Figure 6:
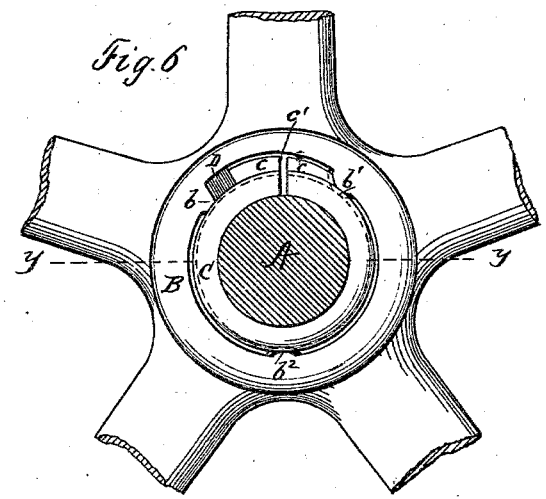
Figure 7:
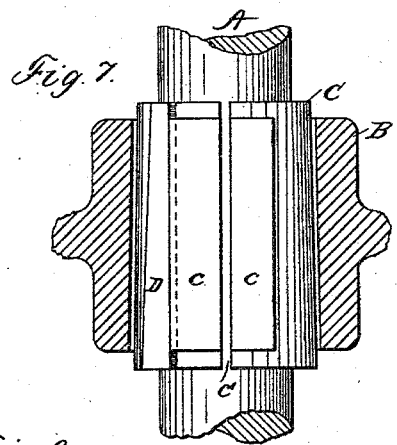
Figure 8:
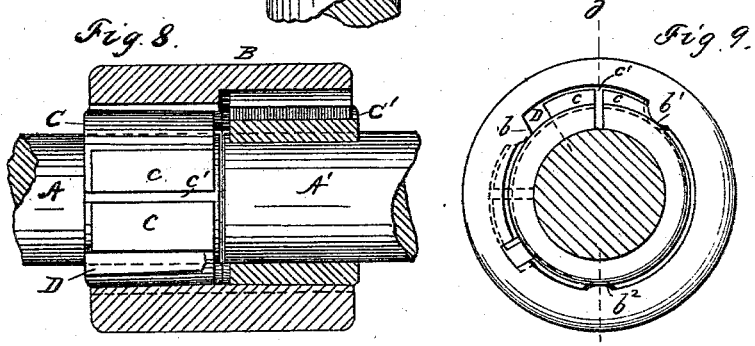
Figure 9:
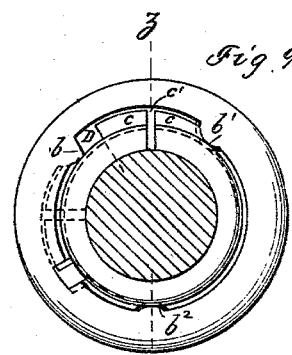

The invention is illustrated in the accompanying drawings as follows:

Figure 1 is a perspective view showing a flanged hub of a wooden pulley broken away, so as to show the inner parts. Fig. 2 is a like view of the hub and flange only. Fig. 3 is a like view of the compression-sleeve. Fig. 4 shows the shaft and compression-sleeve in elevation and the hub and flanges in section on the line $x\ x$ in Fig. 5. Fig. 5 is an elevation view of the hub, flange, and compression-sleeve, looking at the inside of the flange and along the shaft-line. Fig. 6 shows the invention applied to a common iron gear or pulley. Fig. 7 is a section on the line $y\ y$ in Fig. 6. Figs. 8 and 9 show the invention applied to a shaft-coupling.

Letters of reference indicate parts as follows: A is the shaft. B is the hub of the pulley, or gear, or the body of the coupling, as the case may be. C is the compression-sleeve, which has two longitudinal lugs or lobes, $c\ c$, and a kerf or split, $c'$. D is the compressing-key. Such other letters as are used will appear in proper place hereinafter. The pulleys, gears, or couplings are fastened upon the shaft by means of a compression-sleeve and a compressing-key.

I am aware that compression-sleeves are old. They have been used in various forms. They are often made tapering or conical, and are forced into the hub by a nut applied in various ways. They have been cast within the hub by properly coring, and then operated upon by tapered screw-bolts and various other appliances.

My invention consists in the construction and mode of operation substantially as herein shown, which is as follows: The hub or body of the pulley, gear, or coupling is cast with an opening sufficiently larger than the shaft to accommodate and receive the sleeve. On the inside of this opening are lugs $b$, $b'$, and $b^2$. The sleeve is formed with lugs $c\ c$ on each side of its split $c'$. When the sleeve is in place the lugs $c\ c$ of the sleeve lie between the lugs $b\ b'$ of the hub, and the key D is placed between the lug $b$ and the lug $c$, the other lug $c$ having a bearing upon the lug $b'$. The key D is wedge-shaped slightly, and when driven in it will compress the split sleeve C.

When this device is used upon the hub-irons of a wooden pulley, as shown in Figs. 1 to 5, the lug $b'$ may be omitted, for the centering of the pulley is effected by the shaft-openings in the sides of the hub; but when the device is used on an iron pulley or gear the lug $b'$ is essential, as it is necessary to hold the sleeve concentric. The method of construction in this latter instance is as follows: The opening in the hub is made with a very slight taper, and the outside of the sleeve is cast with a corresponding taper. This permits the sleeve to be well seated in the hub. When the pulley is turned up the sleeve, before being split, is set firmly into the opening and is bored out as the pulley is turned up, thus making its bore concentric with the rim of the pulley. The sleeve is then split or kerfed, as at $c'$. In putting the pulley on the shaft the sleeve is put in place and the key is driven in gently, and while this is being done the hub is tapped back gently also, so as to keep the sleeve seated on the lugs $b\ b'\ b^2$ as it is compressed, and thus keep the pulley concentric with the shaft.

If desired, the key D may be dispensed with by making the lugs $b\ b'$ close enough together to just receive the lugs $c\ c$, and making either the bearing-faces of the lugs $b\ b'$ or the lugs $c\ c$ slightly or sufficiently tapering to compress the sleeve as the pulley or gear is pushed or driven upon the sleeve; or, if desired, screws may be tapped through the hub at right angles to the sleeve and made to act upon the bearings $c$ at each end, and so compress the sleeve; but I consider the key the preferable device. There may be two or more sleeves of varying thickness fitted up for each pulley, so as to adapt the pulley to shafts of different size.

What I claim as new is—

1. In a compression-fastening for pulleys, gears, and couplings, the combination, substantially as shown, of a hub, B, having two bearings, $b\ b'$, a split sleeve, C, having two bearings, $c\ c$, and a key, D, applied substantially as shown.

2. In a compression-fastening for pulleys, gears, and couplings, the combination, substantially as shown, of the hub B, with bearings $b\ b'\ b^2$ within its opening, the same being slightly tapering, a split sleeve, C, having a corresponding taper on its outside and the bearings $c\ c$ on each side of its split $c'$, and finally a key, D, applied substantially as shown.

3. In a compression-fastening for pulleys, gears, and couplings, the combination, substantially as shown, of a compression-sleeve having two bearings, $c\ c$, each side of its kerf, a hub or body having an offset within its opening to receive the said bearings $c\ c$, and finally means, substantially as described, for compressing said sleeve by pressure upon said bearings $c\ c$.

In testimony whereof I affix my signature in presence of two witnesses.

ELIJAH F. SPAULDING.

Witnesses:
 SAML. J. BESTOR,
 ELMER S. SMITH.